United States Patent [19]
Schowe et al.

[11] Patent Number: 5,355,502
[45] Date of Patent: Oct. 11, 1994

[54] LOW POWER DISK DRIVE CLOCK GENERATOR CIRCUIT

[75] Inventors: Lester Schowe; Roger Bailey, both of Longmont, Colo.

[73] Assignee: Maxtor Corporation, San Jose, Calif.

[21] Appl. No.: 939,051

[22] Filed: Sep. 2, 1992

[51] Int. Cl.⁵ .............................................. G06F 1/04
[52] U.S. Cl. ..................................... 395/750; 395/550
[58] Field of Search ................ 395/750, 550; 364/707; 371/66

[56] References Cited

U.S. PATENT DOCUMENTS

| | | | |
|---|---|---|---|
| 4,893,271 | 1/1990 | Davis et al. | 395/550 |
| 5,155,451 | 10/1992 | Gladden et al. | 331/1 A |
| 5,167,024 | 11/1992 | Smith et al. | 395/375 |
| 5,261,082 | 11/1993 | Ito et al. | 395/550 |

FOREIGN PATENT DOCUMENTS 0522720  1/1993  European Pat. Off. ....... G06F 1/32

*Primary Examiner*—Allen R. MacDonald
*Assistant Examiner*—Glenn A. Auve
*Attorney, Agent, or Firm*—Blakely, Sokoloff, Taylor and Zafman

[57] ABSTRACT

A clock generator circuit for use with a low power data storage unit includes a resonator circuit for providing a first output frequency resonating at a fundamental frequency of a quartz crystal. A frequency multiplication circuit for multiplies the first output frequency by a predetermined factor to produce a second output frequency greater than the first output frequency. This second output frequency is coupled to the data storage unit and is used during normal read/write mode of operation. In a low power mode of operation, a switching network couples the first output frequency directly to the data storage unit so as to reduce the overall power consumption.

6 Claims, 1 Drawing Sheet

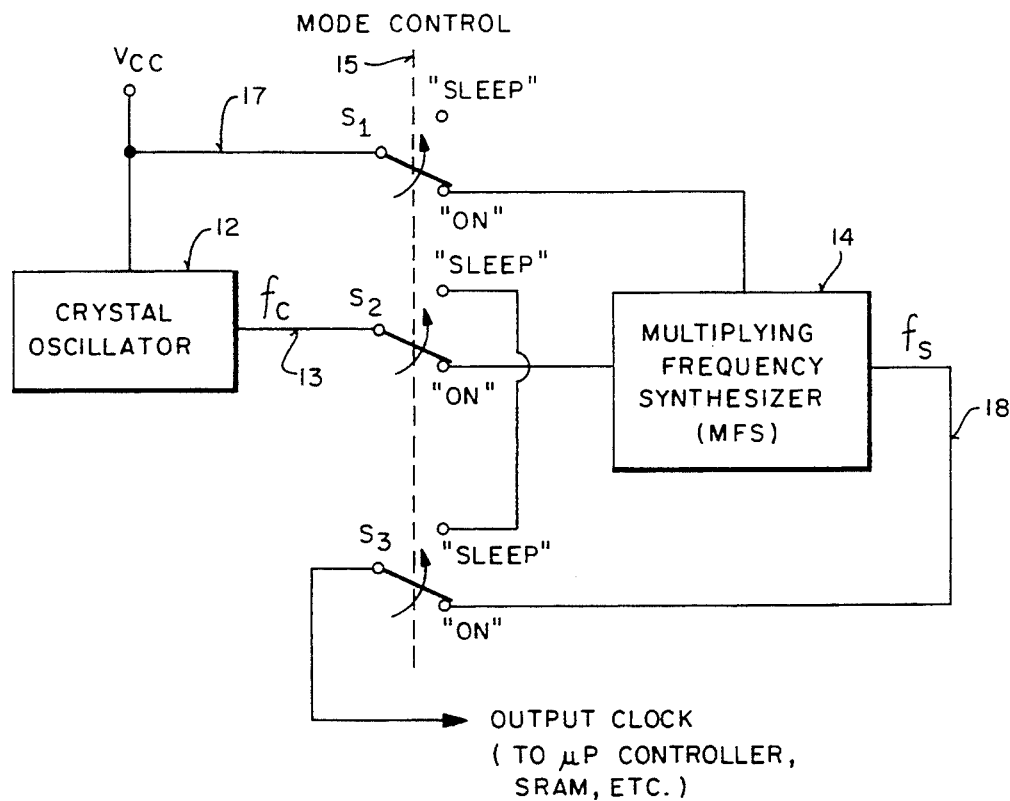
FIG_1
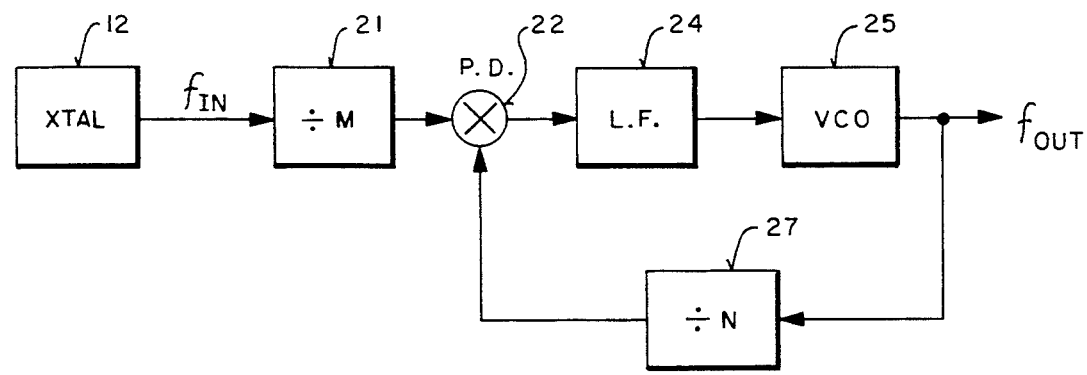
FIG_2

LOW POWER DISK DRIVE CLOCK GENERATOR CIRCUIT

FIELD OF THE INVENTION

The present invention relates generally to the field of magnetic storage devices. More particularly, the invention relates to circuits for conserving power in data storage units incorporated into portable computers.

BACKGROUND OF THE INVENTION

Many high speed computers utilize some form of disk drive technology for information storage. Most commonly, hard disk drives (also known as rigid disk drives) are employed as the main memory resource. In a rigid disk drive, one or more disks rotate at a constant angular speed, with concentric data tracks being recorded on their surfaces. Transducers, also known as recording heads, are positioned over the desired data track by means of an actuator to either read or write information onto the disk surface. In this type of data storage system, information is recorded as a series of magnetic transitions stored on the surface of the disk medium.

The current trend in the computer industry is to provide portable computers which can be powered for extended periods of time using a battery. These computers are frequently known as laptop computers, notebook computers, hand-held computers, and like. One of the challenges in producing a computer which can be easily transported by its user is the management of system power. That is, the goal is to be able to conserve the average power consumed by the device and thereby prolong battery life. In the past, considerable attention has been focused on developing low power circuit designs in order to reduce the amount of standby power consumed by the computer's microprocessor and related circuitry. In these designs various processor functions are disabled or turned off when they are not required or in current use. Few designs, however, have addressed the need for conserving power used by the computer's disk drive unit.

Disk drives generally utilize complementary metal-oxide semiconductor (CMOS) technology for generating the external clock signal required by the disk drive unit, as well as the internal circuitry utilized for reading and writing information to the magnetic disk. Although CMOS circuits minimize power consumption in quiescent or study state conditions, power consumption can still be quite high during switching transitions. For example, the primary power consumption in CMOS designs lies in the power consumed by the output drivers during logic level changes. Especially problematic is the fact that power consumption of CMOS oscillating clock circuits increases with higher frequencies.

In the past, practitioners have used low power CMOS crystal oscillator designs for generating the clock signal required by the disk drive. However, because the clock signal required can typically be on the order of several hundred megahertz, prior art designs have generally employed crystals using higher (i.e., overtone) harmonics. By way of example, these crystal oscillators usually operate at overtone frequencies greater than 16 MHz. As noted above, the power consumption of a CMOS crystal oscillator increases with increasing frequency. For instance, third overtone crystal oscillators are typically needed to generate the high frequency clock signals required by most modern disk drives.

Another drawback of disk drives that utilize overtone mode crystals, is that they suffer from low efficiency. In addition, overtone mode crystal oscillators require more elaborate matching circuitry which further reduces their power efficiency. These inefficiencies result in power requirements that exponentially increase with frequency. Obviously, providing such high frequency clock signals to the disk drive unit on a continual basis means that a great deal of power is consumed due to the nature of CMOS circuitry, and also because of the inefficiency of conventional oscillator circuitry. Therefore, what is needed is an apparatus for conserving power in a disk drive unit incorporated into a portable computer.

As will be seen, the present invention provides a clock generating circuit which utilizes a crystal oscillator circuit operating at a fundamental frequency to minimize power consumption. In addition, the present invention incorporates circuitry for reducing the frequency of the clock signal provided to the disk drive unit when in a stand-by or low power mode of operation.

SUMMARY OF THE INVENTION

The invention is a clock generating circuit for use with a low power data storage unit. In one embodiment, the present invention comprises a resonator circuit means for providing a first output frequency. The resonator circuit means includes a crystal resonating at a fundamental frequency. The first output frequency is coupled to a frequency multiplication circuit means for multiplying the first output frequency by a predetermined factor. This produces a second output frequency which is greater than the first output frequency. This second output frequency is coupled to the data storage unit where it is thereafter utilized during normal read/write operations.

The invention also includes a switching means for coupling the first output frequency to the frequency multiplication circuit means when the clock generating circuit functions in the normal mode of operation. When the computer is in a low power mode of operation, the switching means couples the first output frequency directly to the data storage unit; bypassing the frequency multiplication means. The power to the frequency multiplication means is then turned off. Because the first output frequency is intentionally made to be much smaller than the second output frequency and power is removed from the frequency multiplication means, the overall power consumption of the data storage unit is radically reduced in the low power mode of operation.

BRIEF DESCRIPTION OF THE DRAWINGS

The present invention is illustrated by way of example and not limitation in the figures of the accompanying drawings, in which like references indicate similar elements, and in which:

FIG. 1 is a conceptual block diagram of the present invention.

FIG. 2 is a block diagram of the multiplying frequency synthesizer circuit utilized in one embodiment of the invention.

DETAILED DESCRIPTION

A novel circuit for generating a clock signal having at least two different frequencies to achieve power conservation in a disk drive unit is described. In the following description, numerous specific details are set forth, such as specific frequencies, circuit elements, etc., in order to provide a more thorough understanding of the present invention. It will be obvious, however, to one skilled in the art that these specific details need not be used to practice the present invention. In other instances, well-known structures and circuits have not been shown in detail in order to avoid unnecessarily obscuring the present invention.

Referring to FIG. 1, there is shown a block diagram of one embodiment of the clock generating circuit of the present invention which includes a crystal oscillator 12 and frequency synthesizer 14. Both oscillator 12 and synthesizer 14 are preferably fabricated as a single integrated circuit. Crystal oscillator 12 includes a quartz crystal which in the current embodiment operates at a fundamental frequency of 10 MHz. The quartz crystal itself, and several passive components (i.e., capacitors, etc.), are connected externally to the integrated circuit. On the other hand, the crystal drivers, frequency synthesizer 14 and switching logic are all preferably integrated on a single silicon substrate.

Crystal oscillator 12 is coupled to a power supply potential $V_{CC}$ and produces a fundamental frequency output on line 13. Output line 13 is coupled to frequency synthesizer 14 via a switching element $S_2$. Similarly, power supply potential $V_{CC}$ is also shown being coupled to frequency synthesizer 14 along line 17 via switching element S. Optionally, synthesizer 14 may be coupled directly to $V_{CC}$ rather than through switch $S_1$. This aspect of the invention will be discussed in more detail later.

Multiplying frequency synthesizer 14 comprises a phase-locked loop (PLL) circuit utilized by the clock generator circuit for multiplying the fundamental frequency provided by crystal oscillator 12 by a predetermined factor. For example, in the current implementation, frequency multiplying synthesizer 14 multiplies the fundamental frequency provided on line 13 by a factor of 6. The higher frequency signal output by synthesizer 14 is ordinarily provided as the disk drive system clock. (labeled $f_s$ on line 18). Output Line 18 is shown coupled to the disk drive's unit read/write circuitry which normally comprises a microprocessor, SRAM, etc. Note that line 18 is coupled to the disk drive unit via switching element $S_3$.

A normal mode of operation is defined when the disk drive unit is utilized by the computer system for its ordinary, intended purpose; i.e., reading and writing information to the magnetic storage medium. During this normal mode of operation each of switching elements $S_1$–$S_3$ is switched to the "ON" position shown in FIG. 1. The switching position multiplies the fundamental frequency provided by oscillator 12 so that the clock signal supplied to the drive's microprocessor is the output signal $f_s$ of synthesizer 14. For the opposite situation when a low power mode of operation is desired each of the switching elements $S_1$–$S_3$ in FIG. 1 is switched to the "SLEEP" position such that power is conserved as part of an overall low power mode of operation for the computer system. For example, a computer may be left on for long periods of time without any data accessing activity. Under these circumstances, the circuit of FIG. 1 is switched to a "SLEEP" mode of operation. In sleep mode, the relatively slow clock frequency of oscillator 12 is directly coupled to the disk drive unit, bypassing synthesizer 14. In the current implementation, switching is achieved by firmware providing mode control as indicated by dashed line 15 in FIG. 1. Alternatively, a signal provided by the system's microprocessor or other mode control circuitry can be used to switch from a normal to a reduced power (i.e., "SLEEP") mode of operation. In this respect, it should be understood that switches $S_1$–$S_3$ may comprise any one of a variety of switching devices, such as ordinary n-channel field effect devices.

When operating in sleep mode, the fundamental frequency signal output along line 13 is switched in a manner that directly couples it to the disk drive unit where it functions as the clock signal for the disk drive during its reduced power state. At the same time, switching elements $S_2$ and $S_3$ disconnect the output frequency signal $f_s$ produced by the synthesizer 14 on line 18 from the microprocessor and related circuitry of the drive unit. Thus, the data storage unit is switched from being driven by a high frequency clock signal to being driven by a relatively low frequency clock signal. Again this is being accomplished in a variety of ways by means of a mode control function depicted in FIG. 1 by dashed 15.

Appreciate that the use of a lower clock frequency coupled to the disk drive is advantageous in that the lower frequency results in significantly reduced power consumption within the drive unit. Moreover, because crystal oscillator 12 operates at a fundamental frequency, this means that the oscillator circuit itself operates at a much lower power level. Thus, the power consumption of both the drive and the clock generating circuit is significantly reduced when switched to a sleep mode of operation.

Note that in FIG. 1, switch $S_1$ is shown disconnecting multiplying frequency synthesizer 14 from power supply voltage $V_{CC}$ during sleep mode of operation. In other words, connecting synthesizer 14 to $V_{CC}$ through switch $S_1$ offers the additional advantage of further reducing power consumption by turning off the internal circuitry in synthesizer 14 during sleep mode. Alternatively, switch $S_1$ can be eliminated from the present invention and synthesizer 14 connected directly to power supply $V_{CC}$ on a permanent basis.

It should be understood that completely disconnecting the clock signal from the drive unit causes significant problems during "wake-up" or re-powering of the drive. The problem is that the drive needs to have a clock present at all times, otherwise, the drive cannot be awakened. For instance, once the clock signal is completely turned off, restarting the drive unit requires recalibrating the servo mechanism; also, the recovered clock signal of the drive must be reestablished. Recalibration and recovery of the clock can take a relatively long time. Of course, during this waiting period the user is prevented from accessing data from the disk.

The present invention overcomes this drawback by providing a low frequency clock signal to the drive during low power mode so that upon a return to the normal mode of operation, them is no waiting period which must lapse before data access can occur. The mason for this is that the clock recovery circuitry of the disk drive relies upon its own phase-locked loop which must be supplied with a clock input on a continuous basis to avoid lapses in data accessing.

Referring now to FIG. 2, a circuit block diagram of multiplying frequency synthesizer 14 is shown. The frequency synthesizer includes a first divider circuit 21 for receiving the fundamental frequency provided by crystal oscillator 12. Divider 21 divides the input frequency, $f_{IN}$, received from oscillator 12 by an integer M, which in the current embodiment is one. The output frequency, $f_{OUT}$, is generated by a voltage controlled oscillator (VCO) 25. The output frequency of voltage controlled oscillator 25 is adjusted in accordance with a control voltage signal provided by phase detector 22. This control voltage signal is filtered through a low pass filter 24 before being input to VCO 25.

A well-known element of phase locked loop circuits, phase detector 22 compares the frequency output by divider 21 with the frequency signal output by divider 27; it then generates the control voltage signal accordingly. The operation is such that the phase detector either advances or retards the frequency of VCO 25 depending on the phase relationship of the signals output from dividers 21 and 27. Frequency divider 27 divides the output of the voltage control oscillator 25 by N, where N is an integer, so that the overall multiplication factor provided by frequency synthesizer 14 is equal to the ratio N:M. The relationship between the input and output signals can be expressed mathematically by the equation $$f_{OUT} = (N/M) f_{IN}$$

In the currently preferred embodiment, N is equal to six and M is equal to one, so that the overall multiplication factor is six. Hence, for a 10 MHz input frequency, synthesizer 14 outputs a 60 MHz clock signal.

Table 1 below summarizes the operation of the data storage unit in accordance with the disk drive clock generating circuit of the present invention.

TABLE 1

|  | MODE | |
| --- | --- | --- |
|  | Normal | Low Power |
| Output Clock | $F_s$ | $F_c$ |
| MFS $V_{cc}$ Power Input | ON | OFF |

What is claimed is:

1. A clock generating circuit for use with a data storage unit, said clock generating circuit comprising:
   a resonator circuit providing a first output signal having a first frequency;
   a frequency multiplication circuit multiplying said first output signal by a predetermined factor to produce a second output signal having a second frequency, said second output signal being coupled to said data storage unit, said second frequency being greater than said first frequency, said frequency multiplication circuit comprising a phase-locked loop circuit including a first frequency divider means for dividing said first output signal by M, where M is an integer; an oscillator circuit providing said second output signal adjusted by a controlled voltage; a second frequency divider means for dividing said second output signal by N, where N is an integer greater than M, said predetermined factor being determined by the ratio N:M; a phase detector means for comparing the output of said first frequency divider with the output of second frequency divider, said phase detector means generating said control voltage therefrom: and
   a switching circuit coupling said first output signal to said frequency multiplication circuit to generate said second output signal coupled to said data storage unit when said clock generating circuit operates in a normal mode, said switching circuit coupling said first output signal directly to said data storage unit when said clock generating circuit operates in a reduced power mode.

2. The clock generating circuit of claim 1 wherein said resonator circuit comprises a crystal resonating at said first frequency.

3. The clock generating circuit of claim 2 wherein said oscillator circuit further comprises a logic circuit coupled to said crystal for generating said first output signal, said logic circuit and said phase-locked loop circuit being fabricated on the same integrated circuit.

4. The clock generating circuit of claim 1 wherein said switching means disconnects said frequency multiplication circuit from a power supply when said clock generating circuit operates in said reduced power mode.

5. In a data storage unit which utilizes a clock signal to read/write information on a recording medium, said data storage unit being incorporated into a battery-powered computer, a method of generating first and second frequency signals in accordance with two power conservation modes of operating said data storage unit comprising the steps of:
   resonating a crystal oscillator circuit to produce said first frequency signal;
   coupling said first frequency signal directly to said data storage unit during a low power mode of operation; otherwise,
   multiplying said first frequency signal by a predetermined factor to generate said second frequency signal coupled to said data storage unit during a normal mode of operation, said second frequency signal being higher than said first frequency signal, and wherein said multiplying step includes the steps of:
   dividing said first frequency signal by M, where M is an integer, to produce a first intermediate signal;
   dividing said second frequency signal by N, where N is an integer greater than M, to produce a second intermediate signal, said predetermined factor being determined by the ratio N:M;
   comparing said first and second intermediate signals and generating a control voltage therefrom; and
   adjusting said second frequency signal in accordance with said control voltage.

6. In a data storage unit coupled to receive a clock signal utilized in the transfer of information to/from a recording medium, said data storage unit being incorporated into a portable computing device, a clock generator circuit for generating said clock signal in accordance with two modes of operating said data storage unit, said circuit comprising:
   a resonator circuit providing a first output signal having a first frequency;
   means for multiplying said first output signal by a predetermined factor to produce said clock signal, said clock signal having a second frequency higher than said first frequency, said multiplying means including a first frequency divider for dividing said first output signal by M, where M is an integer; an oscillator circuit providing said clock signal adjusted by a controlled voltage; a second frequency divider for dividing said clock signal by N, where N is an integer greater than M, said predetermined factor being determined by the ratio N:M; and a phase detector for comparing the output of said first frequency divider with the output of second frequency divider and generating said control voltage therefrom;

said clock generator circuit further comprising a switching circuit coupling said first output signal to said multiplying means to generate said clock signal coupled to said data storage unit when said clock generating circuit operates in a normal mode, said switching circuit coupling said first output signal directly to said data storage unit when said clock generating circuit operates in a reduced power mode.

* * * * *